July 3, 1956

G. HASE ET AL 2,752,712

DEVICE FOR ADJUSTING AND HOLDING
A PAIR OF STEREOSCOPIC PICTURES

Filed Oct. 22, 1953

2 Sheets-Sheet 1

INVENTORS
Georg Hase, Herman Schneider
+ Kurt Kirchhoff
by Thomsen K Beaman
Attorney

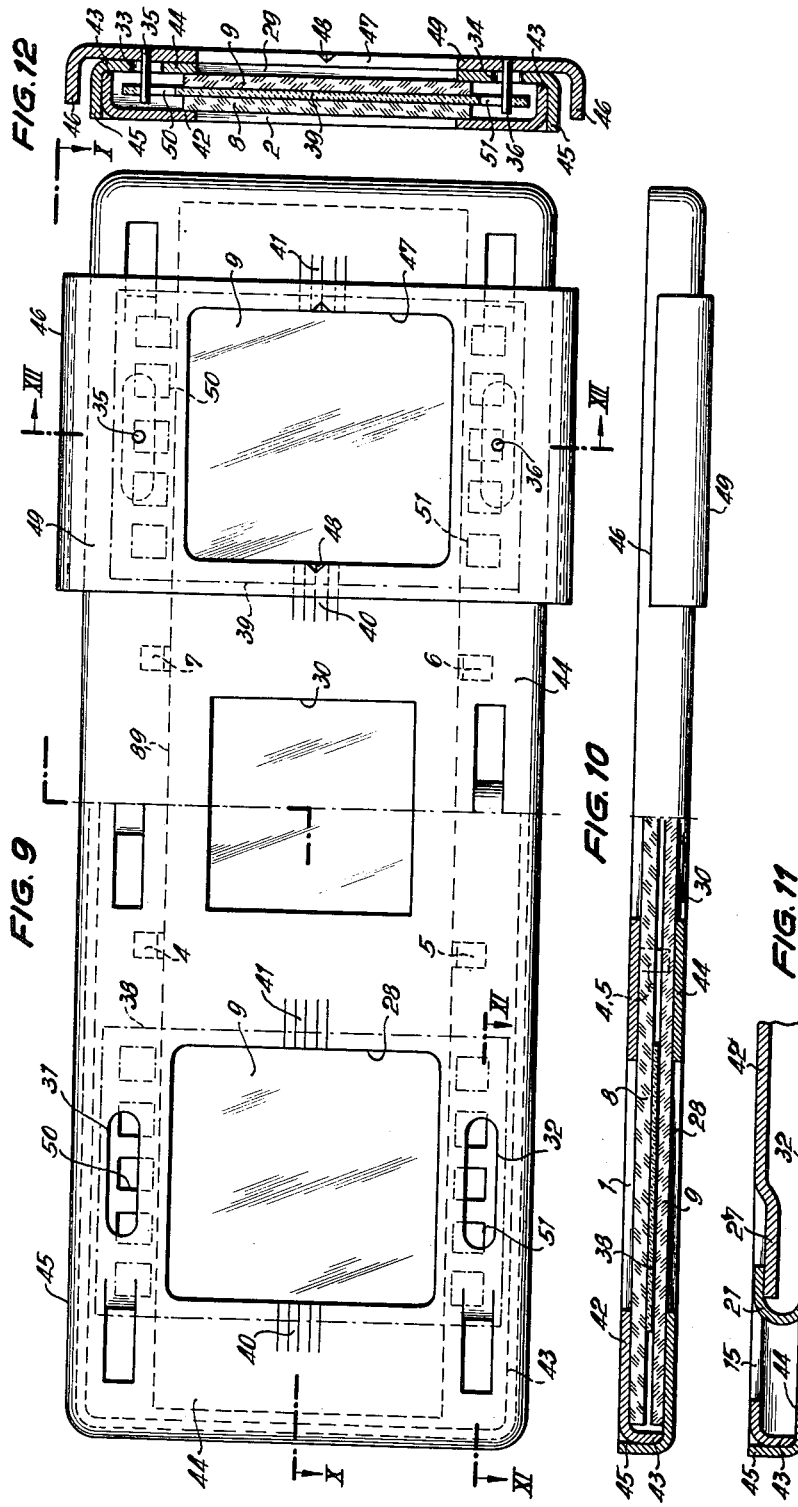

United States Patent Office 2,752,712
Patented July 3, 1956

2,752,712

DEVICE FOR ADJUSTING AND HOLDING A PAIR OF STEREOSCOPIC PICTURES

Georg Hase, Hamburg-Klein-Flottbek, Hermann Schneider, Hamburg-Bahrenfeld, and Kurt Kirchhoff, Hamburg-Lurup, Germany Application October 22, 1953, Serial No. 387,716

Claims priority, application Germany October 25, 1952

7 Claims. (Cl. 40—152)

The object of this invention is to mount the separate pictures of stereo picture pairs between transparent, especially glass panes in order to protect them from dust, fingerprints, damage or deformation, for the purpose of viewing or projection and for keeping them at an exact distance from each other, assuring a correct positioning of the edges of the pictures.

When viewing or projecting stereoscopic pictures, it is of great importance for a convincingly plastic effect that the two pictures are very carefully adjusted, i. e. both pictures should be mounted at exactly the same height, mounting the picture vertically and not at an angle, the distances of the chief points of observation of each image having exactly the same distance from each other as have the edges of the pictures; this will assure an effective window or stage effect. Here the chief points are meant as being those points which are situated in the proximate foreground of the image. This is obtained by adjusting the objectives of the projector or the eyepiece of the stereoscope until a perfect alignment of the edges of the pictures assures an image which, from the frame where the chief points of observation are, appears to reach far out into the distance.

As has already been mentioned, it is a prerequisite for achieving this result to bring the chief points of observation absolutely in line with each other, since these must vary on the uncut film in the camera according to the setting of the distance as well as does the distance of the object of observation at the moment the picture is taken and must consequently be made to correspond to the lateral limitation of the edge of the picture.

Transparent holders currently in use offer no possibility of an exact adjustment of the two stereoscopic pictures, nor of an adjustment for uniform height and vertical position. Our invention, however, allows an adjustment of the stereoscopic pictures after they have been placed in the holders with regards to height, distance, and vertical positioning in a very easy manner without the necessity of taking the frame apart again and thus leaving a correct adjustment more or less to chance.

Figure 1:
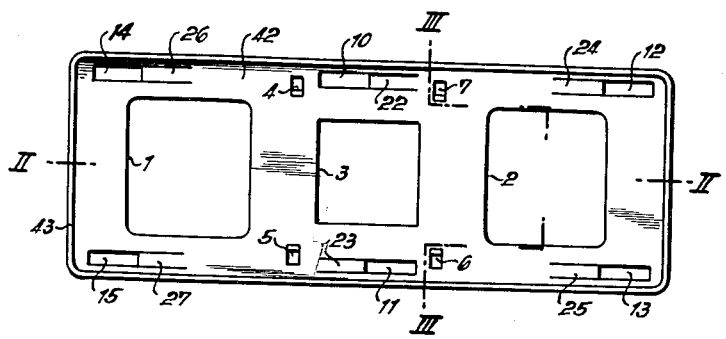
Figure 3:
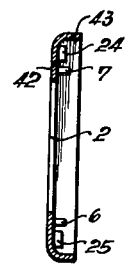
Figure 2:
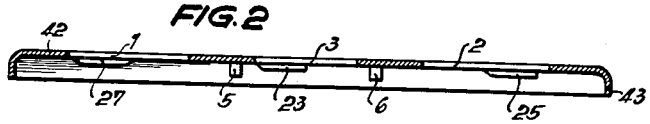
Figure 4:
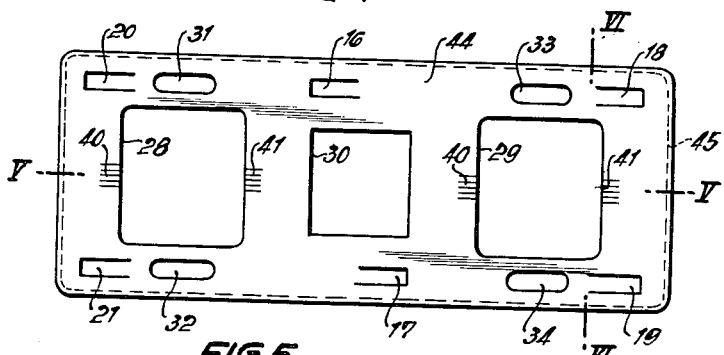
Figure 6:
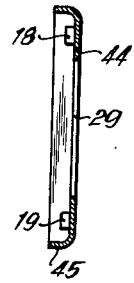
Figure 7:
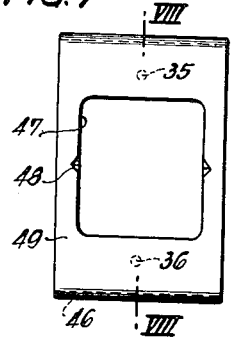
Figure 8:
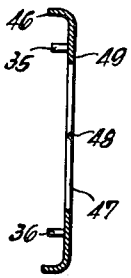

Fig. 1 shows a plan view of a frame constructed according to the invention,

Fig. 2 shows a longitudinal section of the frame taken along the plane of line II—II of Fig. 1, Fig. 3 shows a cross section of the frame taken along the plane of line III—III of Fig. 1, Fig. 4 shows a plan view of another frame constructed according to the invention and adapted to form a holding structure in co-operation with the frame shown in Figs. 1–3, Fig. 5 shows a longitudinal section of the other frame taken along the plane of line V—V of Fig. 4, Fig. 6 shows a cross section taken of the other frame along the plane of line VI—VI of Fig. 4, Fig. 7 shows a plan view of a tool or key adapted to be used in connection with the invention, Fig. 8 shows a cross section of the tool or key taken along the plane of line VIII—VIII of Fig. 7, Fig. 9 shows a plan view of the holding structure constructed according to the invention and mounted ready for use, in a bigger scale, Fig. 10 shows a longitudinal section of the holding structure taken along the plane of line X—X of Fig. 9, Fig. 11 shows a longitudinal section of a part of the holding structure taken along the plane of line XI—XI of Fig. 9, Fig. 12 shows a cross section of the holding structure taken along the plane of line XII—XII of Fig. 9.

Figure 5:
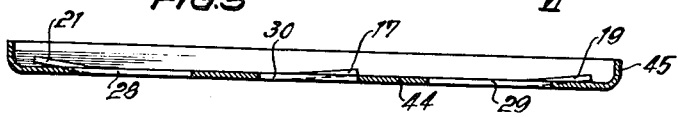

The holder according to the invention is including two frames 42 and 44 which are shown in a detailed manner in Figs. 1 to 6 inclusively. In these drawings, the first frame 42 is shown in Figs. 1 to 3, and the second frame 44 is represented in Figs. 4–6.

The first frame 42 is made of deep-drawn metal sheeting and is provided with two windows 1 and 2 adapted to limit the pictures of a stereopicture pair. This frame has a turned off edge 43 which limits the circumferential extension of this metal sheet. It is provided with four protruding lugs 4, 5, 6, 7 adapted to serve as support for two transparent glass panes 8, 9 in a manner which is shown and disclosed in a more detailed manner on the basis of Figs. 9 to 12.

Additionally the frame is provided with a third window 3 which can be used for the insertion of any inscription. This window 3 is conveniently positioned between the two windows 1 and 2.

This frame 1 is furthermore provided with openings 10, 11, 12, 13, 14, 15, which are of a rectangular form in the shown embodiment of the invention. There are disposed adjacent these rectangular openings 10, 11, 12, 13, 14, 15, lugs 22, 23, 24, 25, 26, 27, which are bent inwardly in a manner shown especially in Fig. 2 for forming recesses in the proximate neighbourhood of the openings 10, 11, 12, 13, 14, 15 as it will be apparent especially from Fig. 2 of the drawings. Openings 10, 11 and the adjacent recessed lugs 22, 23 are situated in the neighbourhood of the middle window 3 for a purpose which will be more clear from the following specification.

The frame 44 shown in Figs. 4 to 6 is similarly made of deep-drawn sheet metal and is provided with an edge 45 in such a manner that edge 43 of frame 42 is snugly fitting into edge 45 of frame 44 so the two frames 42, 44 can be properly adjusted and centered one with respect to another. Frame 44 is provided with two windows 28 and 29 equal to windows 1 and 2 of frame 42 and aligning with them in a mounted condition. In correspondance thereto frame 44 has a middle window 30 which can be used for inscription purposes and which is advantageously positioned in alignment with window 3 of frame 42 in a mounted position.

Additionally frame 44 has six cut out lugs 16, 17, 18, 19, 20, 21, which are bent a little out of the plane of frame 44 (compare Fig. 5) and which are adapted to be bent additionally over the recessed lugs 22, 23, 24, 25, 26, 27 respectively of frame 42 in a manner which will be more clearly shown and disclosed below. These cut out lugs 16, 17, 18, 19, 20, 21 are juxtaposed with respect to openings 10, 11, 12, 13, 14, 15 respectively in a mounted condition.

Directly above and below the two windows 28, 29 there are provided in frame 44 four openings 31, 32, 33, 34. The distance between openings 31 and 32 on the one side and 33 and 34 on the other side is equal to the distance between the transport perforations of an ordinary and usual film picture. The side edges of windows 28, 29 are provided with scale graduations 40, 41 for a purpose which will become apparent from the following description.

Figs. 7 and 8 show a key which may be advantageously used in connection with the holder including the two frames 42 and 44. This key or tool is shown in the embodiment of the invention as been composed of a deep-drawn sheet metal provided with two pins 35 and 36 the distance of which corresponds to that of openings 31, 32 respectively 33, 34 of frame 44, i. e. the distance between the two rows of transport perforations of a usual film. This key is additionally provided with two turned off edges 46 the distance of which is a little greater than the width of frame 44, so that this key may be conveniently put over frame 44. Furthermore key 49 has a window 47, the dimensions of which are substantially corresponding to those of windows 1, 2, 28, 29. This window 47 is provided with two markings 48 adapted to co-operate with scale graduations 40 and 41 of windows 38 and 39 of frame 44.

The method of mounting the two frames for forming a holding structure and of using the same will now be more fully explained on the basis of Figs. 9–12 inclusively. In these figures references 38, 49 have been used for designating the pictures of a stereo picture pair. These pictures are in the form of films bearing transport perforations 50, 51 and their contours are represented in dash-dotted lines in Fig. 9, whilst the thickness of these pictures have been overdrawn in Figs. 10 and 12 for illustrative purposes.

In order to mount the pictures 38 and 39, first place a glass pane 8 into the first frame 42 shown in Figs. 1 to 3. Next place both separated pictures 38, 39 into their approximately proper position. After having covered them with a second glass pane 9, the outer or second frame as shown in Figs. 3 to 6 will be placed over the assembly. Hereby lugs 4, 5, 6, 7 are supporting panes 8, 9 in their proper position.

Now it will be expedient to fold the center lugs 16 and 17 into openings 10 and 11 of frame 42 and thereafter to bend these lugs over the recessed lugs 22, 23 respectively. The adjustment of the pictures 38 and 39 can now be carried out with the aid of key 49 shown in Figs. 7 to 8, inserting its pins 35, 38 in the openings 31, 32, 33, 34 and the transport perforations 50, 51 (compare Figs. 9 and 12). Markings 48 and scale graduations 40, 41 will assist in finding out and adjusting the proper positions of the pictures 38, 39.

After a projection has proved the fact that the separate pictures have been accurately and properly adjusted, the remaining lugs 18, 19, 20, 21 of frame 44 will also be folded into the respective openings 12, 13, 14, 15 of frame 42 and bent over the respective recessed lugs 24, 25, 26, 27.

Both pictures 38, 39 will thus be definitely secured in their proper position.

The method of folding lugs 16, 17, 18, 19, 20, 21, for the purpose of connecting the two frames 42, 44, one with another, into openings 10, 11, 12, 13, 14, 15 of frame 42 and to bend said lugs over the recessed lugs 22, 23, 24, 25, 26, 27 of the same frame is shown in a more detailed manner in Fig. 11 taking as example lug 21 of frame 44 and opening 15 and recessed lug 27 of frame 42.

The type of the openings, the shape of the key, as well as the action of the key on the pictures may, of course, be of any other suitable kind.

We claim:

1. In a device for adjusting and holding a pair of stereoscopic pictures in determined reltaionship, in combination, a first frame provided with a first pair of windows in a determined relationship, a pair of transparent pane means adapted to cover said pair of windows and to be received by said first frame, and to receive a part of said pair of pictures between them, a second frame provided with a second pair of windows, the mutual position and the dimensions of said second pair of windows being substantially equal to those of said first pair of windows, means for connecting the said first and second frames with another in such a position that the said pairs of windows are aligned one with respect to the other, whereby the said pair of transparent pane means is supported between said frames, a plurality of said means for connecting said frames being distributed over the surfaces of said frames and being independently operative to connect said frames gradually, and openings in one of said frames arranged outside the plane of said pairs of transparent pane means, said openings being adapted to receive tool means for adjusting said pair of pictures independently of one another.

2. In a device for adjusting and holding a pair of stereoscopic film pictures proved with aligned transport perforations in a proper relationship, in combination, a first sheet metal frame provided with a first pair of windows in a determined relationship and with a first turned over edge for defining the dimensions of said first frame perpendicularly with respect to the surface of said first pair of windows, a pair of transparent pane means adapted to cover said pair of windows and to be received by said first frame, and to receive the picture part of said pair of film pictures between them, whereby the width of said transparent pane means is smaller than that of said pair of film pictures substantially by the width of said transport perforations, a second sheet metal frame provided with a second pair of windows and with a second turned over edge for defining the dimensions of said frame perpendicularly with respect to the surface of said second pair of windows, the mutual position and the dimensions of said second pair of windows being substantially equal to those of said first pair of windows, said first turned over edge fitting into said second turned over edge, whereby said pairs of windows are aligned with respect to one another, means for connecting said frames with one another, whereby said pair of transparent pane means is supported between said frames, a plurality of said means for connecting said frames being distributed over the surfaces of said frames and being independently operative for connecting said frames gradually, and two pairs of openings in one of said frames arranged in the region of said transport perforations of said pair of film pictures, said openings serving to receive tool means for adjusting said pair of film pictures independently of one another.

3. A device as claimed in claim 2, said connecting means including bendable lugs provided on one of said frames and engageable with openings provided in the other of said frames.

4. A device as claimed in claim 2, said connecting means including bendable lugs provided on one of said frames and engageable with openings and recessed lugs provided in the other of said frames.

5. A device as claimed in claim 2, said tool being provided with lugs engaging the perforations of the films.

6. A device as claimed in claim 2, said tool including a window substantially equal to the windows of said frames and being provided with graduated scale means for the purpose of indicating the respective position of said pair of film pictures.

7. A device as claimed in claim 2, one of said frames being provided with graduated scale means for the purpose of indicating the respective position of said pair of film pictures.

References Cited in the file of this patent

UNITED STATES PATENTS

| | | |
|---|---|---|
| 1,679,083 | Helmquest | July 31, 1928 |
| 2,088,944 | Young | Aug. 3, 1937 |
| 2,527,765 | Roehrl | Oct. 31, 1950 |
| 2,528,366 | Houston | Oct. 31, 1950 |
| 2,599,382 | Goldberg | June 3, 1952 |
| 2,656,631 | Caldwell | Oct. 27, 1953 |